United States Patent [19]
Haider

[11] Patent Number: 5,852,540
[45] Date of Patent: Dec. 22, 1998

[54] CIRCUIT FOR PROTECTING THE INPUT/OUTPUT STAGE OF A LOW VOLTAGE INTEGRATED CIRCUIT DEVICE FROM A FAILURE OF THE INTERNAL VOLTAGE SUPPLY OR A DIFFERENCE IN THE POWER-UP SEQUENCING OF SUPPLY VOLTAGE LEVELS

[75] Inventor: Nazar S. Haider, Fremont, Calif.

[73] Assignee: Intel Corporation, Santa Clara, Calif.

[21] Appl. No.: 936,846

[22] Filed: Sep. 24, 1997

[51] Int. Cl.⁶ .................................................. H02H 3/22
[52] U.S. Cl. ........................... 361/111; 361/56; 326/81; 326/86
[58] Field of Search ................. 361/111, 90, 91, 361/56, 86; 327/327, 313, 328; 326/83, 86, 80, 81, 27, 14, 9

[56] References Cited

U.S. PATENT DOCUMENTS

| | | | |
|---|---|---|---|
| 5,319,259 | 6/1994 | Merrill | 307/443 |
| 5,352,935 | 10/1994 | Yamamura et al. | 307/296 |
| 5,448,198 | 9/1995 | Toyoshima et al. | 327/530 |
| 5,528,129 | 6/1996 | Kaneko et al. | 323/313 |
| 5,592,423 | 1/1997 | Tokami | 365/221 |
| 5,608,594 | 3/1997 | Fukuda | 361/58 |
| 5,617,283 | 4/1997 | Krakauer et al. | 361/56 |
| 5,627,493 | 5/1997 | Takeuchi et al. | 327/546 |
| 5,635,861 | 6/1997 | Chan et al. | 326/81 |
| 5,719,737 | 2/1998 | Maloney | 361/111 |

*Primary Examiner*—Jeffrey Gaffin
*Assistant Examiner*—Kim N. Huynh
*Attorney, Agent, or Firm*—Blakely, Sokoloff, Taylor & Zafman LLP

[57] ABSTRACT

A circuit for protecting internal logic circuits of an integrated circuit (IC) device from a failure of internal voltage supply is disclosed. A protection circuit is connected between the internal power supply and an external power supply. The protection circuit reduces the external power to the internal logic circuits. A pass circuit is connected to the protection circuit and the internal power supply. The pass circuit is configured to reduce the input voltage difference in the protection circuit in the event of a failure of the internal power supply to prevent a failure of the protection circuit. The voltage level of the external power supply is typically higher than the internal supply voltage level, and exposure to the full external voltage level may disable the protection circuit.

22 Claims, 7 Drawing Sheets

FIG. 1 *(PRIOR ART)*

CIRCUIT FOR PROTECTING THE INPUT/OUTPUT STAGE OF A LOW VOLTAGE INTEGRATED CIRCUIT DEVICE FROM A FAILURE OF THE INTERNAL VOLTAGE SUPPLY OR A DIFFERENCE IN THE POWER-UP SEQUENCING OF SUPPLY VOLTAGE LEVELS

FIELD OF THE INVENTION

The present invention relates generally to integrated circuits, and more specifically to protecting input/output buffer circuits from differences in supply voltage levels.

BACKGROUND OF THE INVENTION

As process technology shrinks the feature sizes of transistors, integrated circuit operating voltages must be reduced every process generation to limit the tolerant electric fields across the terminals of the transistors. In certain semiconductor manufacturing processes, voltages in excess of 2.0V across the gate-drain junctions of the transistors pose a potential for gate oxide breakdown, thus negatively impacting the reliability and quality of the devices produced through these processes.

FIG. 1 is a cross-sectional representation of the composition of a typical n-channel MOSFET device. An n-channel MOSFET is composed of two n+ regions 108 embedded within a p-substrate 110. Gate 102 is separated from the substrate 110 by oxide layer 112. Channel 114 is a conducting n-type region which is formed when the gate 102 is brought positive with respect to the source 106 and substrate 110. Reducing the transistor size affects not only the dimension of the transistor, but the performance characteristics of the transistor, as well. For example, reducing the lateral dimension of a transistor pushes the drain 104 and source 106 closer to one another. This effectively reduces the amount of time required for electrons to flow from the drain to the source. Making the oxide layer 112 thinner can also enhance the performance of the transistor. A thinner oxide layer creates a stronger effective electric field and reduces the threshold voltage, $V_t$, thus increasing the effect of the gate voltage on electron flow.

Shrinking a transistor, however, makes it less tolerant to high voltage differentials between its terminals. For example, if the drain and source are too close together, "punch through" may occur. Punch through results from the flow of electrons between the drain and source even if no channel is created. Similarly, if the oxide layer 112 is made too thin, an excessive gate voltage could cause oxide breakdown which results in a short circuit between the three terminals. Even if breakdown does not occur, it is possible for transistor performance to degrade over time through oxide charging effects. Thus, shrinking a transistor lowers the tolerance of the transistor with regard to gate voltages. Consequently, if the gate of the transistor is normally connected to an internal voltage supply, the supply voltage level must be reduced below the maximum tolerable terminal voltage of the transistor.

New integrated circuit devices often incorporate transistors produced with the latest process technology since they feature faster performance and lower power supply requirements. However, in order to maintain compatibility with previous generation products, it is often necessary to continue to support higher voltages at the input/output pins of these devices. For example, older generation computer circuits utilizing CMOS or TTL devices may require supply voltages from 2.5V to 5V. These voltage requirements may thus force the input/output transistors produced by a given semiconductor production process to be tolerant of voltages higher than are supported by that process technology.

One method of interfacing low voltage integrated circuit (IC) devices to higher voltage circuits is to provide protection transistors as buffers on the input and output stages of the integrated circuit. These buffers use the internal supply voltage ($V_{cc}$) of the IC to bias the gates of the input and output transistors to a value which is lower than the external voltage level. Thus, as long as the internal voltage supply operates properly, the devices within the core and the input/output stage operate safely. If, however, the internal voltage supply either fails to turn on, or turns on after the higher external voltage is present on the input/output terminals of the device, the voltage reducing buffers can be rendered inoperable. This internal voltage supply failure is referred to herein as a "power sequencing problem" and can result in potentially irreversible damage to the remaining circuits within the device.

It is therefore an intended advantage of the present invention to provide a circuit which protects the input/output stage of a low voltage integrated circuit device from a failure of the internal voltage supply or a difference in the power-up sequencing of supply voltage levels.

SUMMARY OF THE INVENTION

A circuit is disclosed for protecting the internal logic circuits of an integrated circuit (IC) device from a failure of an internal supply voltage. A protection circuit is coupled to an internal power supply and an external power supply. The internal power supply provides an internal voltage, and the external power supply provides an external voltage. The protection circuit reduces the external voltage to an acceptable supply voltage level for internal logic circuits within the IC device. The protection circuit itself has a maximum terminal voltage difference, which, if exceeded, causes a failure of the protection circuit. The circuit also includes a pass circuit coupled between the protection circuit and the internal power supply. The pass circuit reduces the terminal voltage difference across the protection circuit in the event of a failure of the internal power supply.

In one embodiment of the present invention, the pass circuit is connected between a power supply circuit and a variable voltage supply circuit. The power supply circuit provides the internal voltage to the internal logic circuits within the IC. The variable voltage supply circuit is connected to the external power supply. Upon a failure of the internal voltage, the variable voltage supply circuit provides a trigger voltage to the power supply circuit through the pass circuit. The trigger voltage causes the power supply circuit to provide a bias voltage to the protection circuit. This bias voltage reduces the voltage difference across the terminals of the protection circuit and prevents the protection circuit from being exposed to a voltage which may exceed the maximum terminal voltage difference of the protection circuit.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A circuit for maintaining a bias voltage for input/output protection circuits within an integrated circuit is described. In the following description, numerous specific details are set forth in order to provide a thorough understanding of the present invention. However, it will be understood by those skilled in the art that the present invention may be practiced without these specific details. In other instances, well-known structures, circuits, and devices are shown in block diagram form to facilitate explanation.

Figure 1:
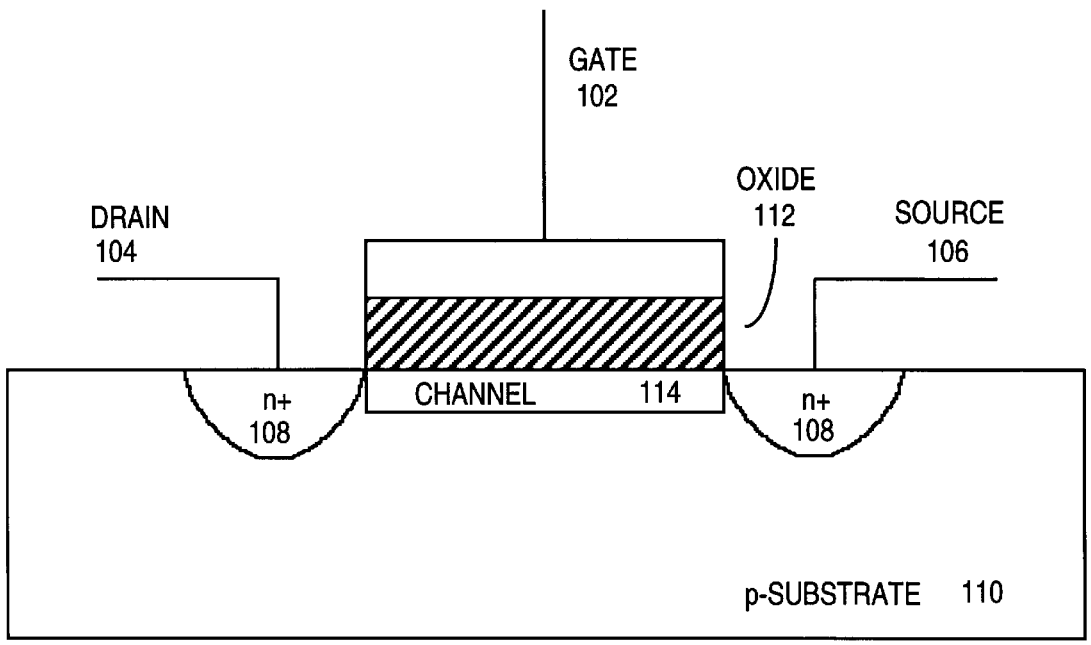
FIG. 1 is a cross-sectional representation of a field effect transistor.
Figure 2:
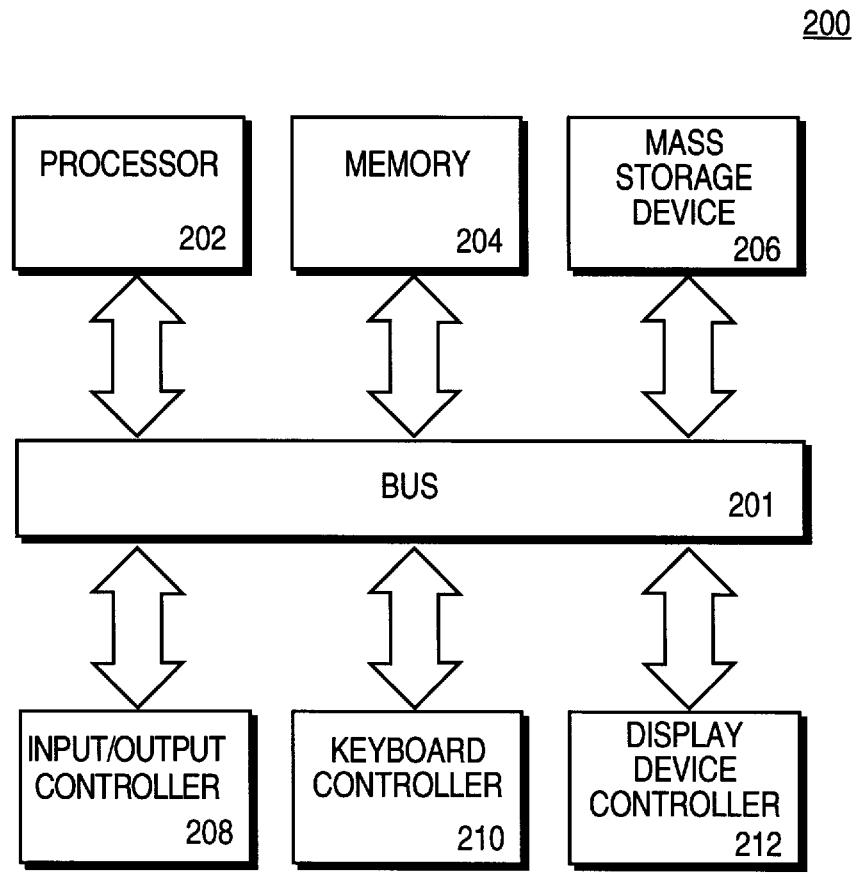
FIG. 2 is a block diagram of a computer system which may include an embodiment of the present invention.

FIG. 2 illustrates a block diagram of a computer system in which the present invention may be used. The computer system 200 includes a processor 202 coupled through a bus 201 to a memory 204 (such as random access memory, RAM, or read-only memory, ROM) and a mass storage device 206 (such as a hard disk). A keyboard controller 210 is coupled to bus 201 for receiving commands or data entry through a keyboard, mouse, or similar input device (not shown to avoid obscuring the present invention). A display device controller 212 is also coupled to bus 201 for providing output through an appropriately coupled display device (not shown to avoid obscuring the present invention). Also coupled to bus 201 may be an input/output controller 208 for interfacing processor 202 to other devices such as network interface devices and the like. It should be noted that the architecture of FIG. 2 is provided only for purposes of illustration, and that a computer system which implements, or is used in conjunction with the present invention is not limited to this specific architecture.

Figure 3:
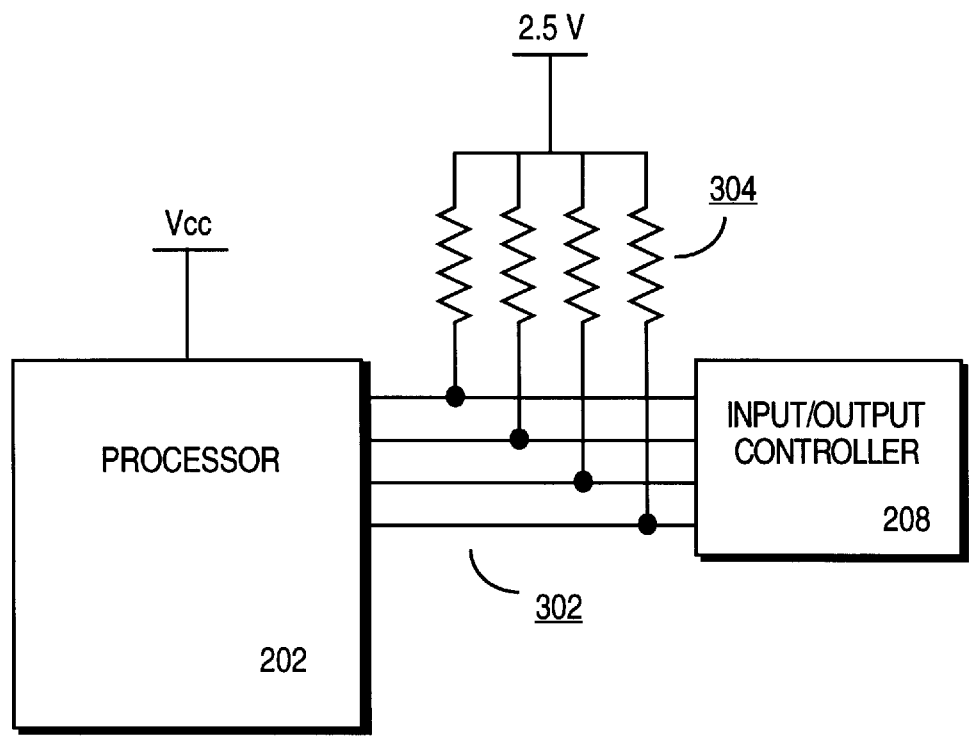
FIG. 3 is block diagram of two components of the circuit of FIG. 1 connected through a representative bus connection, in which one or both of the components includes an embodiment of the present invention.

Certain devices within computer system 200 may represent devices manufactured through production processes which require reduced supply voltage levels. However, certain other devices within computer system 200 may represent older components or components which require higher supply voltage levels. FIG. 3 illustrates a typical interconnection between two components within computer system 200. Processor 202 is connected to input/output controller 208 through a series of wires or circuit traces 302. Processor 202 also includes a separate line for providing an internal voltage level, $V_{cc}$. For some newer generation integrated circuit devices, $V_{cc}$ may be 1.8V or lower. The four wires 302 shown represent a subset of the wires which make up bus 201 within computer system 200. In the bus-based computer system illustrated in FIG. 3, the wires connecting the components are pulled up to an open-drain termination voltage of 2.5V through pull-up resistors 304. The 2.5V level is meant to be illustrative of a termination voltage level which is typically used by the output buffers of general CMOS (Complementary Metal Oxide Semiconductor) transistor circuits to drive a logic "1" onto the bus. A CMOS voltage level, such as 2.5V, however, may be too high for IC devices which are designed to accommodate an internal voltage level of 1.8V to 2.0V.

Figure 4:
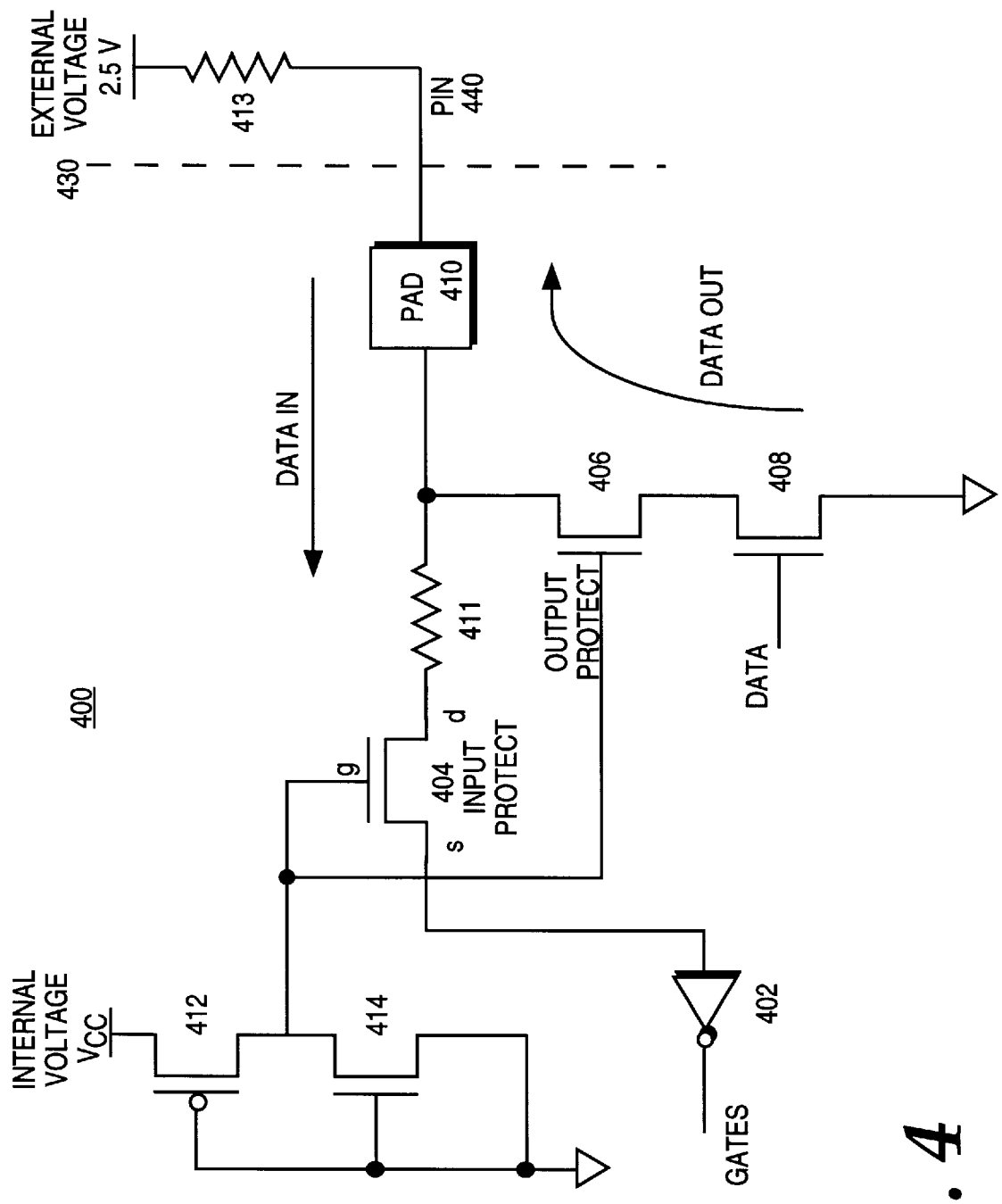
FIG. 4 illustrates input/output protection circuitry which is used in conjunction with the present invention.

One method of maintaining compatibility with higher supply voltages is to provide high voltage tolerant protection transistors (buffers) on the input/output stages of a device. FIG. 4 illustrates an input/output buffer arrangement utilized on certain microprocessors and other like devices, such as processor 202 in FIG. 3. Line 430 represents the physical boundary of the package which contains the device. Circuit 400 illustrates the input/output stage of the device circuit and is part of the circuit which is inside the device package. Pin 440 extends from the device package and provides the electrical and physical point of connection to the device. Also shown in device circuit 400 is pad 410. In one embodiment, pad 410 represents a metal pad which may be used for connecting the silicon die to the package pins using bond wires.

In circuit 400, separate input and output protection transistors 404 and 406 serve to buffer internal logic circuits within the device (also referred to as "icore" circuits) from the higher voltages present on the input/output pins of the device. For example, in circuit 400, a standard CMOS compatible 2.5V level would normally be present at the input of circuit 400 through pin 440. If the core circuits within the device can tolerate a maximum of only 2.1V, the 2.5V input level would represent an unacceptably high voltage.

Output data in circuit 400 is transmitted to pin 440 through an n-channel field effect transistor (FET) 408. Similarly, input data is transmitted from pin 440 to circuit 400 through an n-channel input FET 404. Although FIG. 4 illustrates separate protection transistors for both the input and output circuits, it will be appreciated that a single protection transistor may serve to buffer both input and output circuits, or that only the input or output circuit is coupled to an external supply voltage through a protection transistor.

N-channel transistor 406 acts as a protection device for the output stage of circuit 400. The drain terminal of transistor 406 is connected to pin 440, and the source terminal of transistor 406 is connected to the drain terminal of transistor 408. Likewise, N-channel transistor 404 acts as a protection device for the input stage of circuit 400. The drain terminal of transistor 404 is connected to pin 440 through a resistor 411. Resistor 411 is typically a low impedance resistor which provides protection from electrostatic discharge (ESD) current spikes. The source terminal of transistor 404 is connected to the gates of the core circuits through buffer 402. The gate terminals of both input protection transistor 404 and output protection transistor 406 are connected to internal voltage, $V_{cc}$, through an inverter circuit containing p-channel FET 412 and n-channel FET 414 connected in series. In many applications, the internal voltage may be one to two volts lower than the external open-drain termination voltage (hereinafter referred to as the "external" voltage) on pin 440. In the circuit of FIG. 4, it is assumed that $V_{cc}$ is 1.8V, and the external voltage is 2.5V.

For a standard n-channel MOSFET, the gate-source voltage $V_{gs}$ must be greater than or equal to the threshold voltage, $V_t$, of the transistor in order for the transistor to conduct current from the drain to the source. This is due to the fact that a MOSFET drops a threshold voltage across its terminals. The threshold voltage is the voltage differential between the gate and the source which will cause the transistor to turn on (conduct). For a given semiconductor production process, $V_t$ for a field effect transistor may be approximately 0.4V to 0.5V, and improved processes which produce smaller transistors may yield even lower threshold voltages. Because the gate terminals of protection transistors 404 and 406 are tied to $V_{cc}$ through transistor 412, both transistors 404 and 406 are always on.

In circuit 400, the input of the core circuits is represented by gate 402. The voltage level for the input stage of gate 402 equals the source voltage $V_s$ for input protection transistor 404. As long as input transistor 404 is on, $V_s=V_{cc}-V_t$. Thus, the voltage at the input of buffer 402 and the core circuits is a maximum of $V_{cc}-V_t$, instead of the external voltage present on pin 440. In one embodiment of FIG. 4, $V_{cc}$ is 1.8V and $V_t$ is 0.4V, so $V_s$ is approximately 1.4V. This voltage level is sufficient to drive the input stage of many low-tolerant circuits, yet low enough to prevent oxide breakdown of the transistors.

The output of the core circuits in circuit 400 is provided by transistor 408. If circuit 400 drives a logic "1" onto pin 440, transistor 408 is off since the data is "0" and $V_{gs}$ for transistor 408 is 0V. In this case, the pull-up resistor 413 pulls pin 440 to 2.5V, thus providing the logic "1". However, if circuit 400 drives a logic "0" onto pin 440, the data line to transistor 408 goes to $V_{cc}$, thus turning transistor 408 on. In this case transistor 406 is also on, since its gate is connected to $V_{cc}$ through transistor 412. Since the drain of transistor 408 is connected to the source of transistor 406, $V_d$ for transistor 408 is limited by $V_s$ of transistor 406. As explained above, $V_s$ for a MOSFET is limited to $V_{cc}-V_t$. Thus, the drain voltage for output transistor 408 is limited by the difference in the core supply voltage and the threshold voltage for transistor 406. In the example of circuit 400, the drain voltage for transistor 408 would be 1.8V–0.4V or 1.4V. Thus, the output stage of circuit 400 is protected against a higher external voltage on pin 440.

The protection transistors 404 and 406 are themselves prevented from failing since their gate terminals are tied to $V_{cc}$ and their drain terminals are tied to the external voltage. If the external voltage is 2.5V and $V_{cc}$ is 1.8V, then the difference in voltage between the gate and drain for each of these transistors is approximately 0.7V (2.5V–1.8V). This voltage level is well below the 2.5V external voltage level and is within the tolerance range of most FET devices.

FIG. 4 thus illustrates a circuit which uses an internal voltage to bias the gates of n-channel input and output CMOS protection transistors. The circuit protection provided by circuit 400 however, relies on the reliable maintenance of the internal voltage on the gates of the protection transistors. As long as the internal voltage is reliably provided, transistors 404 and 406 remain on, and the input and output stages of the core circuits remain protected. If, however, the internal voltage either fails to turn on, or is delayed in turning on relative to a higher external voltage on pin 440, protection transistors 404 and 406 will not turn on, and will then be exposed to this higher external voltage level. This can eventually result in a system failure due to loss of the protection transistors. Such a power sequencing problem could be caused by several reasons, such as the failure of a particular power supply circuit or the use of different power regulators which cause power to be delivered to the core circuit at different times. Regardless of the cause, a power sequencing problem can potentially result in irreversible damage to the device if the low tolerance circuitry is exposed too long to a higher than tolerable voltage.

Figure 5:
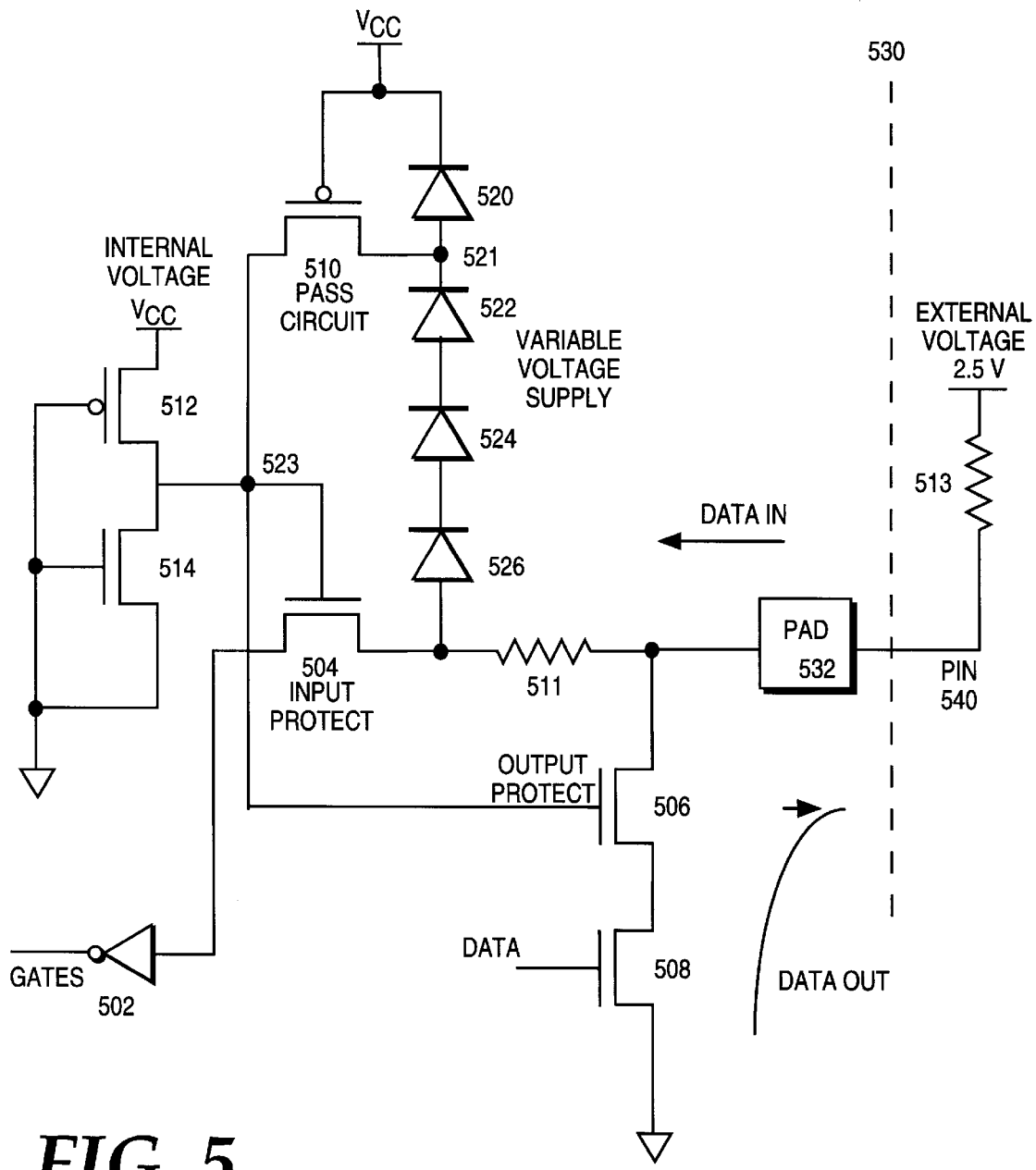
FIG. 5 illustrates a pass circuit for maintaining a bias voltage for protection devices according to one embodiment of the present invention.

FIG. 5 illustrates a circuit according to one embodiment of the present invention which provides a solution to the power sequencing problem which can disable the protection circuit of FIG. 4. Like FIG. 4, FIG. 5 illustrates a device containing an internal input/output circuit 500 within device package boundary 530. External pin 540 connects the internal circuit 500 and pad 532 to a 2.5V external voltage level. Data is input to core circuits through input transistor 504 and buffer 502; and data is output from core circuits through output transistor 508 and output protection transistor 506. As in FIG. 4, transistors 512 and 514 serve as an inverting power supply connecting internal voltage, $V_{cc}$, to the logic circuits within the integrated circuit device.

Like transistors 404 and 406 in circuit 400, transistors 504 and 506 in circuit 500 serve to protect the core circuits from the high external source voltage at pin 540. Unlike circuit 400 in FIG. 4, however, the gate terminal of the input protection transistor 504 and the gate terminal of the output protection transistor 506 are not tied to $V_{cc}$ through only the inverter circuit of transistors 512 and 514. Instead, in one embodiment of the present invention, the gates of these transistors are connected to the source of p-channel pass transistor 510. The gate of pass transistor 510 is connected to internal voltage $V_{cc}$ so that transistor 510 is off (nonconducting) under normal circumstances, since a p-channel FET does not conduct unless the gate voltage is lower than the source voltage by the threshold voltage of the transistor.

In FIG. 5, it is again assumed that $V_{cc}$ is 1.8V. In one embodiment of the present invention, a chain of diodes 526, 524, 522, 520 is connected from pin 540 to $V_{cc}$ through a 300-ohm resistor 511. It is further assumed that diodes with a forward voltage drop of 0.6V to 0.7V are used in the diode chain. Diodes 520, 522, 524, and 526 are selected both in number and forward voltage drop to be sufficient to drop the external voltage to 0V in the event of a failure of the internal supply voltage, and to compensate for any diode overshoot or undershoot conditions. A fractional voltage is taken from node 521 between diodes 520 and 522 to the drain of pass transistor 510. The voltage level at the drain of transistor 510 (node 521) depends on whether $V_{cc}$ is on or off. Under normal conditions when the $V_{cc}$ is on, transistor 510 is off since the gate voltage of the p-channel FET 510 is more positive than the drain voltage. In this case, the diode chain does not conduct, and the gate voltage for transistor 506 and transistor 504 (node 523) is equal to the source voltage $V_s$ of transistor 512. $V_s$ for transistor 512 is $V_{cc}$. Thus, if $V_{cc}$ is on, transistors 504 and 506 have a gate voltage of approximately $V_{cc}$ or 1.8V in the example of FIG. 5. In this case protection transistors 504 and 506 behave substantially as they do in circuit 400 of FIG. 4.

However, if a power sequencing problem causes $V_{cc}$ to not turn on, or to turn on after the external pin voltage turns on, then $V_g$ of transistor 510 drops to 0V which is more negative in relation to $V_d$ (0.7V), and thus transistor 510 turns on. This, in turn, causes the diode chain to conduct current. In this case, the voltage at node 521 equals the voltage drop across diode 520. As illustrated in FIG. 5, the voltage at node 521 would be equal to the forward voltage drop across diode 520 (approximately 0.7V). When the voltage at node 521 is 0.7V, the voltage ($V_s$) at the source terminal of transistor 510 (node 523) will go to the level of node 521, which, in the example is 0.7V. However, because $V_{cc}$ is 0V, transistor 512 is on, and thus the 0.7V at node 523 will cause conduction from the source to the drain of transistor 512. Thus, the voltage created by the forward voltage drop of diode 520 in the absence of $V_{cc}$ effectively triggers transistor 512 to provide voltage at node 523.

Transistor 512 will stop conducting when the voltage at node 523 equals the threshold voltage of transistor 512 since transistor 512 is a p-channel transistor and $V_{gs}$ must be greater than negative $V_t$ for the transistor to conduct. Thus, the voltage at node 523 cannot go lower than $V_t$ of transistor 512 because at that point transistor 512 will turn off. Consequently, the voltage at node 523 equals the voltage drop across diode 520 as limited by $V_t$ of transistor 512. The result is that the maximum effective voltage level at the gates of protection transistors 504 and 506 is $V_t$ of transistor 512. Typically, $V_t$ for a MOSFET such as transistor 512 is approximately 0.4V, and it is assumed that $V_t$ for both transistor 510 and 512 are identical. Thus, the gate voltage $V_g$ on both transistor 504 and transistor 506 will be 0.4V. This voltage level acts as a bias voltage which reduces the gate-drain junction voltage for transistors 504 and 506 to approximately 2.1V, as opposed to 2.5V if $V_{cc}$ was 0V and the external voltage was 2.5V, with no bias voltage reduction.

Although this voltage level is still above the 1.8V level of the internal supply voltage, most field effect transistors produced by a particular process technology are able to withstand an extra 0.2V to 0.3V across their gate-drain junctions. Thus, by providing a bias voltage to the gates of the input protection transistors in the event of a core supply voltage failure, the pass transistor 510 effectively raises the tolerance of the protection transistors and prevents the input stage from breaking down.

FIG. 5 illustrates one embodiment of the present invention in which the chain of diodes 526, 524, 522, and 520 represents a variable voltage power supply for the pass transistor 510 which serves to trigger conduction from the p-channel transistor in the inverter circuit. The trigger voltage provided by the diode chain depends upon the number and type of diodes used to provide a forward voltage drop. Tapping a single diode provides the forward voltage drop for one diode, tapping two diodes provides the combined forward voltage drop for two diodes, and so on. In an alternative embodiment of the present invention, the variable voltage power supply could be implemented through a variable resistor and a transistor connected in series to $V_{cc}$. Other like circuits which provide variable voltage trigger points to the inverting power supply circuit are also possible.

FIG. 5 also illustrates an embodiment of the present invention in which the power supply circuit connecting $V_{cc}$ to the protection circuits is an inverter circuit composed of a p-channel FET connected in series to an n-channel FET. Although this inverter circuit represents one method of providing $V_{cc}$ to core logic within an IC, $V_{cc}$ may also be supplied through non-inverting transistor circuits, or other logic gates (such as a NAND gate). In these cases, alternate embodiments of the present invention may be implemented in which the pass circuit transmits a voltage from the variable voltage power supply to trigger conduction from an appropriate device within the power supply circuit at a value which based upon a threshold voltage for that device.

Figure 6:
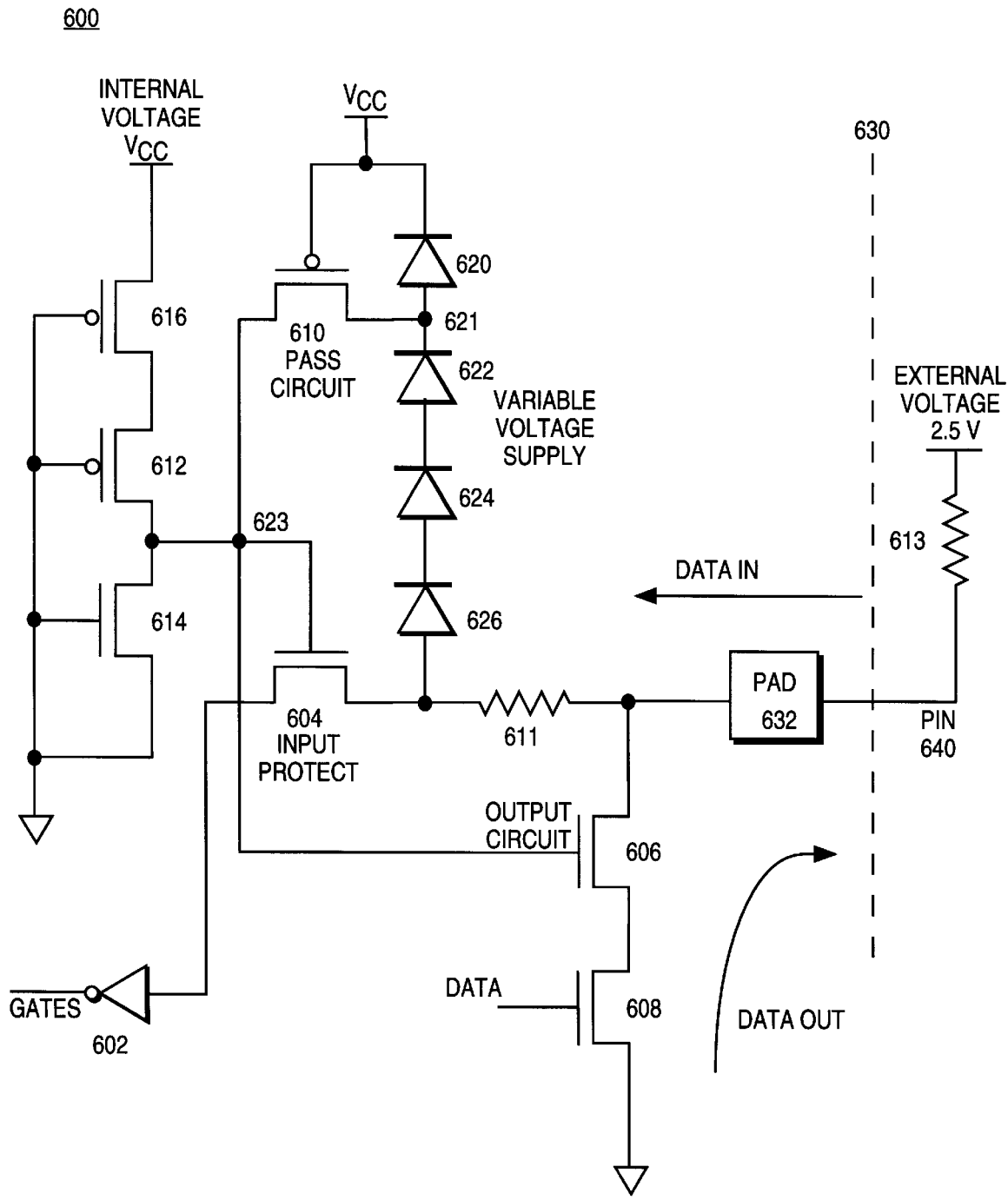
FIG. 6 illustrates a pass circuit for maintaining a bias voltage for protection devices according to an alternate embodiment of the present invention.

FIG. 6 illustrates a protection bias circuit according to an alternative embodiment of the present invention. The circuit of FIG. 6 is substantially similar to the circuit of FIG. 5, except that the power supply (inverter) circuit contains two p-channel transistors connected in series. Like FIG. 5, FIG. 6 illustrates a device containing an internal input/output circuit 600 within device package boundary 630. External pin 640 connects the internal circuit 600 and pad 632 to a 2.5V external power supply level. Data is input to core circuits through input transistor 604 and buffer 602; and data is output from core circuits through output transistor 608 and output protection transistor 606. Again, transistors 604 and 606 in circuit 600 serve to protect the core circuits from the high external source voltage at pin 640. The gates of these transistors are connected to pass transistor 610 and an inverter circuit which contains p-channel pass transistors 612 and 616, and an n-channel transistor 616. The gates of both pass transistor 610 is connected to internal voltage $V_{cc}$ so that they are both off under normal circumstances.

In FIG. 6, it is again assumed that the $V_{cc}$ is 1.8V. A chain of diodes 626, 624, 622, 620 with a nominal forward voltage drop of 0.7V is connected from pin 640 to $V_{cc}$ through a 300-ohm resistor 611. A fractional voltage is taken from node 621 between diodes 620 and 622 to the drain of pass transistor 611. The voltage level at the drain of transistor 610 (node 623) depends on whether $V_{cc}$ is on or off. Under normal conditions when $V_{cc}$ is on, transistor 610 is off since the gate voltage is more positive than the drain voltage. In this case, the diode chain does not conduct, and the gate voltage for transistor 606 and transistor 604 is $V_{cc}$ through transistors 616 and 612. Thus, if $V_{cc}$ is on, transistors 604 and 606 have a gate voltage of exactly $V_{cc}$, and therefore behave as they do in circuit 400 of FIG. 4.

However, if a power sequencing problem causes $V_{cc}$ to not turn on, or to turn on after the external voltage turns on, then the gate voltage of transistor 610 drops to 0V which is more negative in relation to the drain voltage (0.7V), and thus transistor 610 turns on. This, in turn, causes the diode chain to conduct current. In this case, the voltage at node 621 equals the voltage drop across diode 620. As illustrated in FIG. 6, the voltage at node 621 would be approximately 0.7V. When $V_{cc}$ is 0V, transistor 610 is on and node 623 assumes the voltage at the drain of transistor 610. In this case, p-channel transistors 612 and 616 are also on, and the 0.7V at node 623 causes transistors 616 and 612 to conduct, since $V_{cc}$ is 0V.

Like the inverter circuit in FIG. 5, the voltage at node 623 will be limited by the threshold voltage of the transistors in the inverter circuit. In FIG. 6, there are two p-channel transistors in the inverter circuit which tie node 623 to $V_{cc}$, therefore the voltage at node 623 will be the voltage at node 621 limited by $V_t$ of transistor 612 and $V_t$ of transistor 616. If these threshold voltages are equivalent, the voltage at node 623 will be the maximum of node 621 voltage limited by up to $2V_t$. In the example of FIG. 6, therefore, the voltage at node 623 will be the lesser of 0.7V or 0.8V (=2*0.4V). Thus, in this example, the voltage at node 623 is 0.7V, which is the voltage at the gates of protection transistors 604 and 606. This bias voltage reduces the gate-drain junction voltage for transistors 604 and 606 up to approximately 1.8V (2.5V–0.7V), as opposed to 2.5V if $V_{cc}$ was 0V and the external voltage was 2.5V, with no bias voltage reduction.

The circuit of FIG. 6 provides a greater degree of gate-drain voltage reduction than the circuit of FIG. 5, thus improving the tolerance of the protection transistors in high external voltage environments. However, circuit 600 does contain an extra inverter transistor as opposed to circuit 500 of FIG. 5.

As can be seen from FIG. 6, adding p-transistors to the inverter circuit incrementally decreases the threshold voltage limiting the trigger voltage provided by the forward voltage drop across the diode, and thus effectively increases the tolerance of the protection transistors. Because the inverter circuit threshold voltages provide an upper limit to the voltage levels passed to the gates of the protection transistors, the drain voltage of the pass transistor can be tapped from a different point in the diode chain to provide a greater voltage at the source of the pass transistor.

Figure 7:
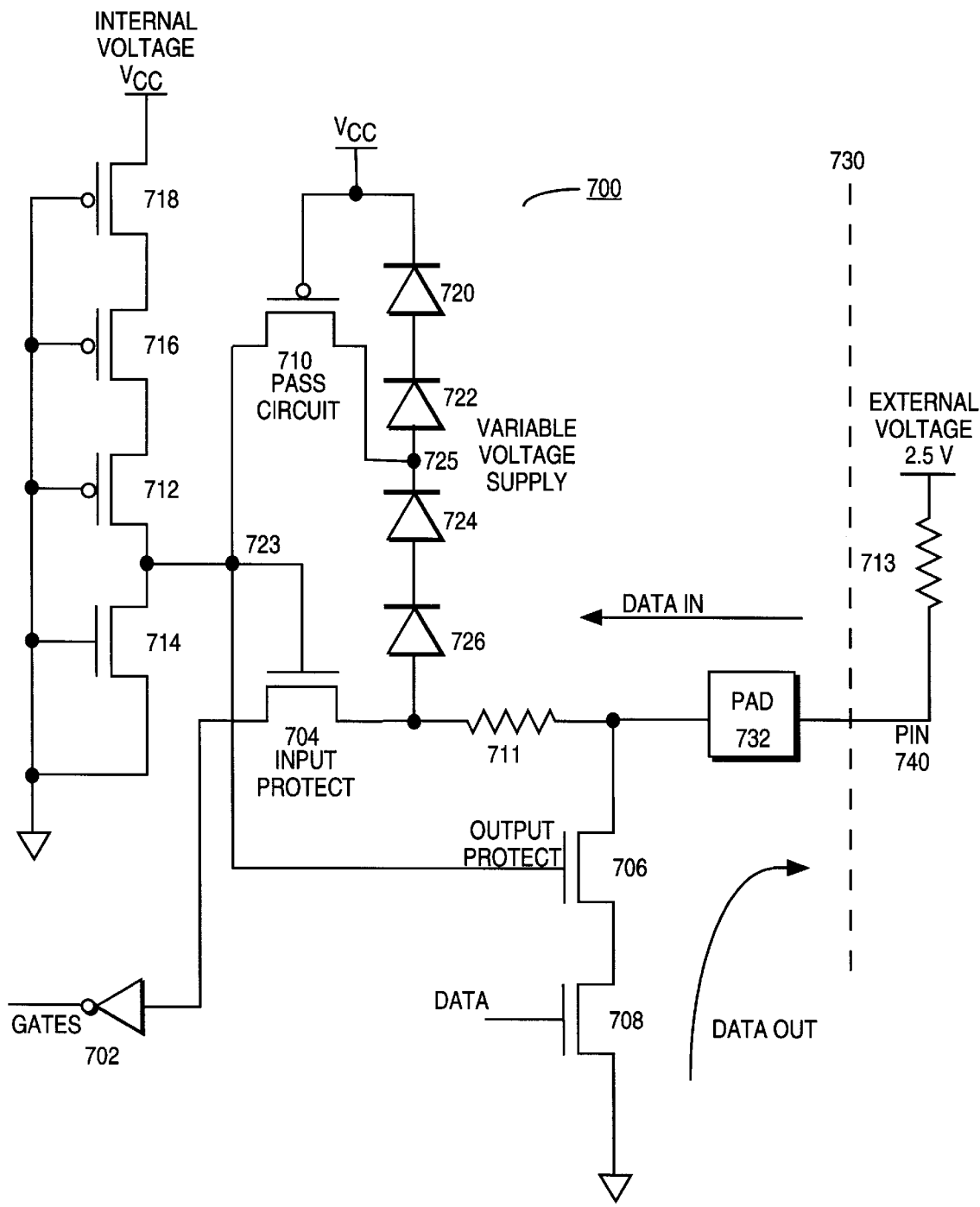
FIG. 7 illustrates a pass circuit for maintaining a bias voltage for protection devices according to a further alternate embodiment of the present invention.

FIG. 7 illustrates a circuit according to a further alternative embodiment of the present invention, in which three p-channel transistors are included in the inverter circuit. In this case, the voltage at node 723 is limited by up to $3V_t$ (approximately 1.2V using the same assumptions as in FIGS. 5 and 6). In order to take advantage of this high threshold voltage, the diode chain is tapped at node 725 between diodes 722 and 724. This provides a drain voltage for pass transistor 710 of 1.4V, assuming diodes 722 and 724 both have a forward voltage drop of 0.7V. As described above in reference to FIG. 5, when $V_{cc}$ is 0V, the voltage at node 723 is equal to the voltage at node 725 as limited by the threshold voltages of transistors 712, 716, and 718. In the example of FIG. 7, the voltage at node 723 would thus be the lesser of 1.4V or 1.2V (3*0.4V). Thus, the gate voltage of protection transistors 704 and 706 is effectively 1.2V, thus reducing the gate-drain junction voltage for transistors 704 and 706 up to approximately 1.3V (2.5V–1.2V), as opposed to 2.5V if $V_{cc}$ was 0V and the external voltage was 2.5V with no bias voltage reduction. Thus, circuit 700 further increases the effective tolerance of protection transistors 704 and 706 over the circuits of FIGS. 5 and 6.

As illustrated in FIG. 7, the effective gate voltage of the protection transistors can be varied depending on the number of p-channel transistors utilized in the inverter circuit, and the location of the tap in the diode chain from which the trigger voltage is derived. In this manner, the amount of bias voltage provided to reduce the maximum voltage differential across the protection device can be varied depending on the maximum value of the external voltage and the relative tolerance of the protection transistors and core circuits.

In the foregoing, a circuit has been described for protecting input/output buffer circuits from a failure of an internal supply voltage. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A circuit within an integrated circuit device comprising:
   a protection circuit coupled to an internal power supply and an external power supply, said internal power supply providing an internal voltage, said external power supply providing an external voltage, wherein said protection circuit is operable to reduce said external voltage for internal circuits within said integrated circuit device, and has associated therewith a maximum terminal voltage difference, which, if exceeded, causes failure of said protection circuit; and
   a pass circuit coupled between said protection circuit and said internal power supply, said internal voltage being lower than said external voltage, and wherein said pass circuit is operable to reduce a terminal voltage difference across said protection circuit in the event of a failure of said internal power supply.

2. The circuit according to claim 1 further comprising:
   a power supply circuit coupled between said internal power supply and said pass circuit, and further coupled between said internal power supply and said protection circuit; and
   a variable voltage supply coupled between said pass circuit and said external power supply.

3. The circuit according to claim 2 wherein, in the event of a failure of said internal power supply, said variable voltage supply provides a trigger voltage through said pass circuit which causes said power supply circuit to provide a bias voltage to said protection circuit, said bias voltage corresponding to a threshold voltage associated with said power supply circuit.

4. The circuit according to claim 3 wherein said bias voltage corresponds to said trigger voltage limited by said threshold voltage.

5. The circuit of claim 3 wherein said power supply circuit and said variable voltage supply circuit are operable to provide a bias voltage which is sufficient to reduce the terminal voltage difference across said protection circuit to a level below said maximum terminal voltage difference.

6. The circuit according to claim 3 wherein said variable voltage supply comprises a plurality of diodes connected serially between said pass circuit and said external power supply.

7. The circuit according to claim 6 wherein said power supply circuit is an inverter circuit comprising one or more p-channel field effect transistors coupled in series to an n-channel field effect transistor, and wherein said threshold voltage corresponds to the voltage between the gate and source terminals of each of said one or more p-channel field effect transistors within said inverter circuit.

8. The circuit according to claim 7 wherein said pass circuit is a p-channel field effect transistor, and said drain terminal of said pass circuit is coupled to said external power supply through a node between a first and second diode of said plurality of diodes, and further wherein said inverter circuit comprises one p-channel field effect transistor coupled in series to one n-channel field effect transistor.

9. The circuit according to claim 7 wherein said pass circuit is a p-channel field effect transistor, and said drain terminal of said pass circuit is coupled to said external power supply through a node between a first and second diode of said plurality of diodes, and further wherein said inverter circuit comprises two p-channel field effect transistors coupled in series to one n-channel field effect transistor.

10. The circuit according to claim 7 wherein said pass circuit is a p-channel field effect transistor, and said drain terminal of said pass circuit is coupled to said external power supply through a node between a second and third diode of said plurality of diodes.

11. A circuit comprising:
    a protection circuit within an integrated circuit device, said protection circuit coupled between an external voltage supply and logic circuits within said integrated circuit device, said protection circuit and said logic circuits operating at an internal voltage level, said protection circuit configured to decrease an external voltage level provided by said external voltage supply by a threshold voltage level associated with said protection circuit, said protection circuit having associated therewith a terminal voltage difference value, which, when exceeded, causes failure of said protection circuit; and
    a pass circuit coupled to said protection circuit and configured to provide a bias voltage to said protection circuit in the event of a failure of the source of said internal voltage level.

12. The circuit of claim 11 further comprising:
    a power supply circuit coupled to said pass circuit and configured to provide said internal voltage level to circuits within said integrated circuit device; and
    a variable voltage supply circuit coupled to said pass circuit and configured to provide a variable voltage to said pass circuit.

13. The circuit of claim 12 wherein said variable voltage supply circuit provides a first voltage to said power supply circuit through said pass circuit upon the failure of said source of said internal voltage level, said first voltage causing said power supply circuit to provide a bias voltage to said protection circuit, said bias voltage reducing a voltage difference across terminals of said protection device below said terminal difference voltage value.

14. The circuit according to claim 13 wherein said variable voltage supply circuit comprises a plurality of diodes connected serially between said pass circuit and said external voltage.

15. The circuit according to claim 14 wherein said power supply circuit is an inverter circuit comprising one or more p-channel field effect transistors coupled in series to an n-channel field effect transistor, and wherein said bias voltage corresponds to the voltage between the gate and source terminals of each of said one or more p-channel field effect transistors within said inverter circuit.

16. The circuit according to claim 15 wherein said pass circuit is a p-channel field effect transistor, and the drain terminal of said pass circuit is coupled to said external voltage supply through a node between a first and second diode of said plurality of diodes, and further wherein said first voltage level corresponds to the voltage at said node between said first and second diode.

17. A circuit comprising:

protection means for protecting logic circuits within an integrated circuit device from a voltage level external to said integrated circuit device, said protection means and said logic circuits operating at an internal voltage level, said protection means decreasing said external voltage level by a threshold voltage level associated with said protection means, said protection means having associated therewith a terminal voltage difference value, which, when exceeded, causes failure of said protection means;

pass means for providing a bias voltage to said protection means in the event of a failure of the source of said internal voltage level;

power supply means coupled to said pass means for providing said internal voltage level to circuits within said integrated circuit device; and voltage supply means coupled to said pass means for providing a variable voltage to said pass means.

18. The circuit of claim 17 wherein said voltage supply means provides a first voltage level to said power supply means through said pass means upon the failure of said source of said internal voltage level, said first voltage level causing said power supply means to provide said bias voltage to said protection means, said bias voltage reducing a voltage difference across terminals of said protection device below said terminal difference voltage value.

19. A computer system comprising:

a plurality of components;

a bus providing physical and logical connections between said plurality of components; and an external power supply providing an external voltage to said plurality of components, and wherein one or more components of said plurality of components includes:

internal logic circuits;

a protection circuit coupled to an internal power supply and said external power supply, said internal power supply providing an internal voltage, wherein said protection circuit is operable to reduce said external voltage for said internal logic circuits, and has associated therewith a maximum terminal voltage difference, which, if exceeded, causes failure of said protection circuit; and a pass circuit coupled between said protection circuit and said internal power supply, said internal voltage being lower than said external voltage, and wherein said pass circuit is operable to reduce a terminal voltage difference across said protection circuit in the event of a failure of said internal power supply.

20. The computer system of claim 19 wherein said one or more components of said plurality of components further comprises:

a power supply circuit coupled between said internal power supply and said pass circuit, and further coupled between said internal power supply and said protection circuit; and a variable voltage supply coupled between said pass circuit and said external power supply.

21. The computer system of claim 20 wherein:

said variable voltage supply comprises a plurality of diodes connected serially between said pass circuit and said external power supply;

said power supply circuit is an inverter circuit comprising one or more p-channel field effect transistors coupled in series to an n-channel field effect transistor; and said pass circuit is a p-channel field effect transistor, and said drain terminal of said pass circuit is coupled to said external voltage level through a node between a first and second diode of said plurality of diodes, and further wherein said inverter circuit comprises one p-channel field effect transistor coupled in series to one n-channel field effect transistor.

22. The computer system of claim 21 wherein, in the event of a failure of said supply of said internal voltage level, said variable voltage supply provides a trigger voltage through said pass circuit which causes said power supply circuit to provide said bias voltage to said protection circuit, said bias voltage corresponding to said trigger voltage limited by a threshold voltage associated with said power supply circuit.

* * * * *

UNITED STATES PATENT AND TRADEMARK OFFICE
CERTIFICATE OF CORRECTION

PATENT NO. : 5,852,540
DATED : December 22, 1998
INVENTOR(S) : Haider

It is certified that error appears in the above-identified patent and that said Letters Patent is hereby corrected as shown below:

Column 3,
Line 2, delete "may include" and insert -- includes --.

Signed and Sealed this

Twenty-second Day of July, 2003

JAMES E. ROGAN
*Director of the United States Patent and Trademark Office*